Sept. 30, 1952     R. S. VOGEL     2,612,379
STAIR CLIMBING VEHICLE ATTACHMENT
Filed July 19, 1949     2 SHEETS—SHEET 1
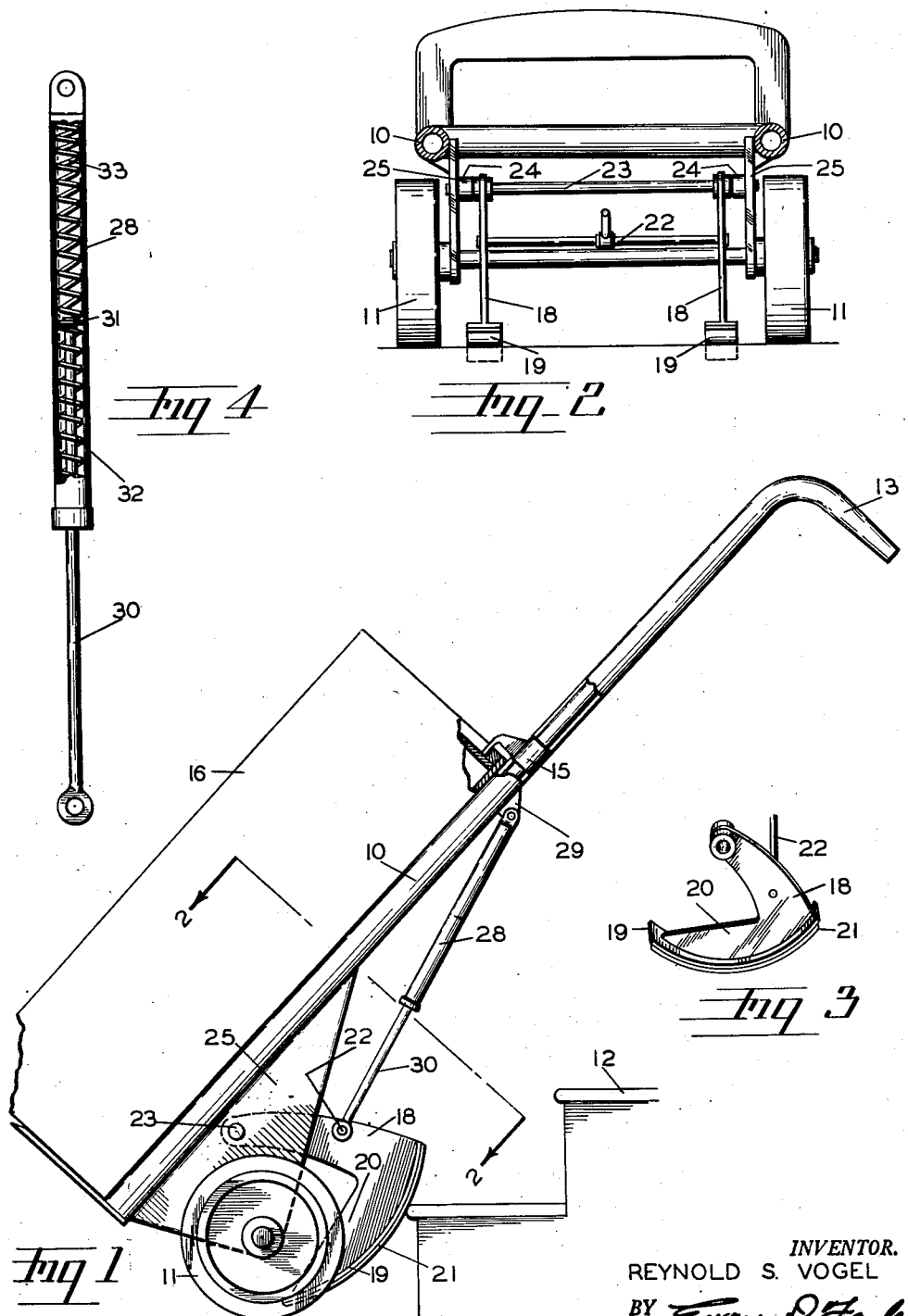
INVENTOR.
REYNOLD S. VOGEL
BY Eugene D. Farley
ATTORNEY Sept. 30, 1952 R. S. VOGEL 2,612,379
STAIR CLIMBING VEHICLE ATTACHMENT
Filed July 19, 1949 2 SHEETS—SHEET 2

INVENTOR.
REYNOLD S. VOGEL
BY
ATTORNEY

Patented Sept. 30, 1952

2,612,379

UNITED STATES PATENT OFFICE 2,612,379

STAIR CLIMBING VEHICLE ATTACHMENT

Reynold S. Vogel, Portland, Oreg.

Application July 19, 1949, Serial No. 105,578

2 Claims. (Cl. 280—5.24)

The present invention relates to a vehicle attachment for enabling the vehicle to traverse obstacles such as steps and the like. More particularly, the present invention relates to an attachment which may be applied especially to wheeled vehicles such as hand trucks and which enables the truck to be drawn smoothly across a flight of steps without lodging of the wheels of the truck against the steps.

Broadly stated, the vehicle attachment of the present invention comprises supporting means attached to the vehicle and adapted to contact the obstacle and support the vehicle as it traverses the same. The supporting means are pivotally attached to the vehicle so that they may move from a first position at which they contact the obstacle and support the vehicle to a second position at which they become disengaged from the obstacle after the vehicle has traversed the same. Means such as resilient means interconnecting the vehicle and the supporting means also are provided for returning the supporting means to their first position after traversal of the obstacle by the vehicle. In such position, it is ready for contact with a succeeding obstacle to assist the vehicle in traversing the same. The supporting means thus has the same effect as a ramp up which the vehicle is drawn, levelling off the obstacle and enabling the vehicle to traverse it smoothly. Where a succession of obstacles is presented, as a series of steps, this effect is prolonged across the entire length of the steps, the supporting means moving back and forth in walking fashion as each step is crossed.

The manner in which the vehicle attachment of the present invention operates and its manifold advantages will be apparent from a consideration of the following specification and claims considered together with the accompanying drawings wherein:

Figure 1 is a side elevation of a vehicle fitted with the presently described attachment illustrated in the process of traversing a flight of steps;

Figure 2 is a sectional view taken along the lines 2—2 of Figure 1;

Figure 3 is a detail view in perspective of one form of supporting means applicable to the attachment of the present invention;

Figure 4 is a detail view in elevation of a spring loaded cylinder applicable as one means for reciprocating supporting means such as that illustrated in Figure 3.

Figure 5:
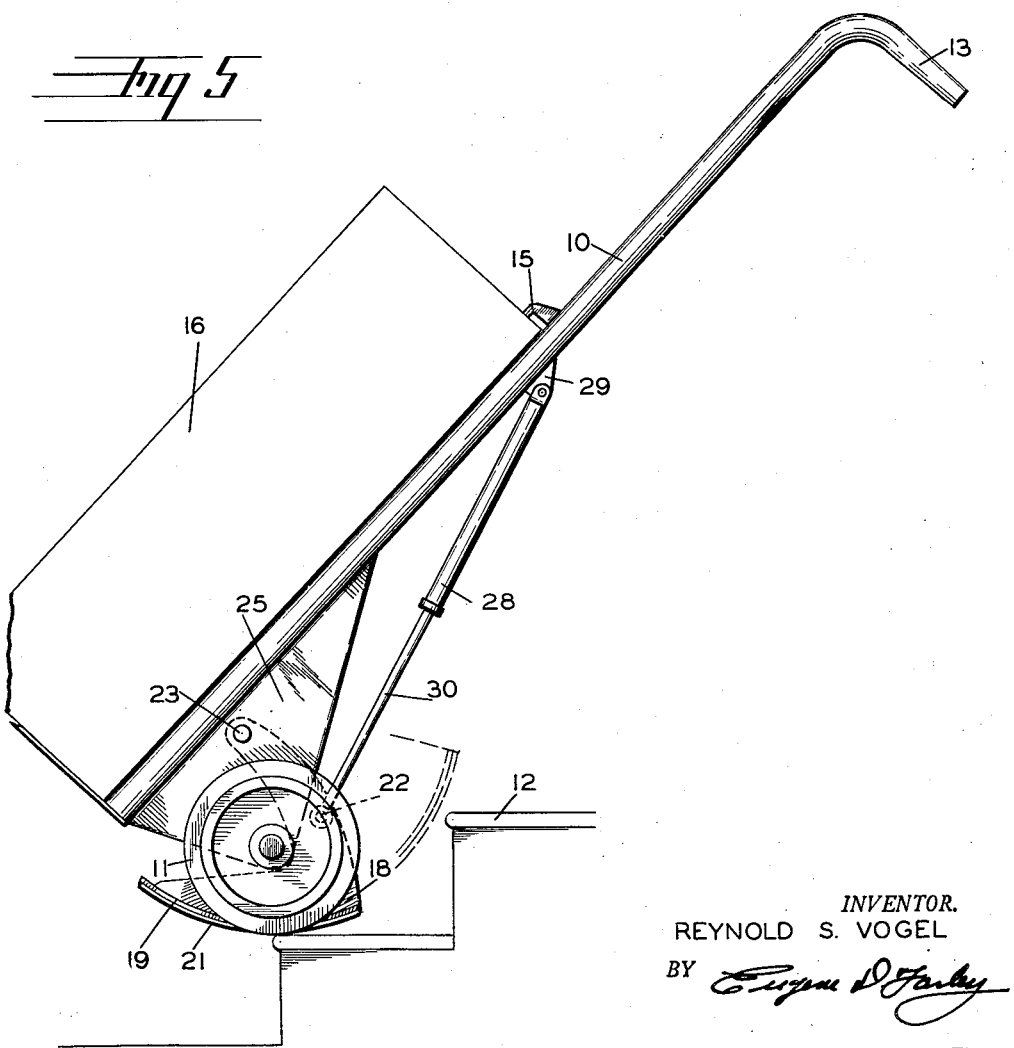
Figure 5 is a view in side elevation of a vehicle fitted with the presently described attachment, similar to the view of Figure 1, but illustrating the vehicle in an advanced position in its traversal of a flight of steps.

In the drawings, the invention is illustrated with particular reference to a hand truck, which runs on a pair of wheels mounted forwardly on the under side of the truck. It will be apparent, however, that the invention is equally applicable to other types of vehicles such as carts, baby buggies and the like as well as to vehicles other than wheeled vehicles, such as those which run on short skids.

Referring now more particularly to the drawings, the attachment of the present invention is illustrated in connection with a hand truck comprising a frame indicated generally at 10 and provided with a pair of wheels 11—11. The truck is illustrated in the process of ascending steps 12 each of which has the conventional overhanging edge which normally would constitute a serious obstacle to the truck since the wheels of the latter would tend to lodge against the overhanging edge, thereby impeding the progress of the truck up the steps.

Also present on the truck are the handles 13 which may be formed as extensions of the frame. Slidably mounted on one or more of the longitudinal frame members is the finger 15 which is adapted to be inserted over and engage an edge or lip of the object 16 being transported by the truck. This secures the object to the truck and prevents it from sliding or rolling off as it is transported across the obstacle.

Means are provided on the truck for contacting the edge of the step or other obstacle and for supporting the vehicle as it traverses the same. In the illustrated form, such means comprise a pair of arms 18—18 with attached feet 19—19. The latter elements preferably are attached rigidly to the arms and are arcuate in shape and reinforced by plate 20. To secure traction and to prevent scuffing or marring of the obstacle being traversed, each of the feet may be surfaced with a layer 21 of rubber, heavy fabric, or other suitable material bonded to the feet by means of an adhesive, rivets, or other suitable means. The arms 18—18 preferably are interconnected by means of the rod 22 and pivotally connected to the vehicle by means of the rod 23 journalled in the bearings 24—24 attached to the plates 25—25. By this construction the arms with their attached feet are enabled to rock back and forth.

The position and dimensions of the arms 18—18 and feet 19—19 with respect to the truck and the wheels 11 thereof are such that in normal use on flat ground the feet are lifted up out of the way behind the wheels. However, when the truck is backed up toward the steps 13 or other obstacle, the feet 19 meet the edge of the obstacle ahead of the wheels. Then, as the motion of the vehicle continues, the arms 18 with feet 19 pivot about the shaft 23, these members supporting the weight of the vehicle during this operation. After the traversal of the obstacle by the vehicle is substantially complete, and the latter is in the position indicated in Figure 5, the wheels of the vehicle again engage the step and bear the weight of the vehicle, the arms 18 and feet 19 being released.

The feet 19 are maintained in a position appropriate for contacting obstacles encountered by the vehicle, and are returned to such position after traversal of the obstacle by the vehicle in the manner explained above by means such as resilient means interconnecting the vehicle and the arms 18 or the attached feet 19. The resilient means employed may comprise a spring loaded cylinder 28, the base of which is attached pivotally to the bracket 29 on the frame of the vehicle, and the piston rod 30 of which is attached pivotally to the rod 22 interconnecting the arms 18. By this construction, a single unit may be used to activate both of the feet 19.

Within the cylinder 28 and attached to the piston rod 30 is the piston 31, interposed between a pair of coiled springs 32—33. The relative positions of the piston and springs is such that, when these members are in equilibrium, the feet 19 will be stationed in the desired position behind the wheels and prepared to engage any obstacle which the vehicle might encounter. However, when the piston is moved against the tension of the spring 32, as occurs when the vehicle traverses the obstacle and the rod 30 is extended by movement of the arms 18, the piston will quickly be returned to its position of equilibrium. It will be apparent that spring 32 alone will accomplish this function, since the force of gravity would return the piston to its neutral position in the event that it is displaced toward the rear of the cylinder. However, it is preferred to include spring 33 behind the piston 31 to make the action of the arms and attached feet more positive.

In operating the presently described vehicle attachment, the vehicle is moved rearwardly until the feet of the attachment engage the obstacle to be traversed, e. g. the first step of a flight of stairs. Upon further movement of the vehicle, the feet firmly engage the step and bear the weight of the vehicle. After the step has been traversed, the wheels engage it and again support the weight of the vehicle. The feet then become disengaged and urged by the tension of the spring in the spring loaded cylinder return to their original position. This brings them opposite the edge of the second step so that, upon continued motion of the vehicle, the second and succeeding steps are traversed, the arms with attached feet rocking back and forth in walking motion during this movement.

The vehicle attachment of my invention may also be applied, of course, when descending a flight of steps. In this case, as the wheels are lowered over the edge of the top step, the feet engage the edge and support the weight of the vehicle as it is being lowered to the next step. Then as soon as the wheels touch this step, the feet are released and spring back to their equilibrium position ready to meet the edge of the next succeeding step. The action of the attachment is particularly valuable in thus descending a flight of steps for, as is well known by those experienced in handling a hand truck, unless the wheels are lined up precisely with the edge of the step in making the descent, the truck is thrown off balance and spills its load. The presently described attachment prevents this, and thus serves a valuable safety function.

Having now described my invention in a preferred embodiment, I claim:

1. A wheeled vehicle comprising a frame, a pair of wheels rotatably mounted one on each side of the frame adjacent one end thereof; obstacle surmounting means comprising a pair of arms pivotally attached one to each side of the frame adjacent the wheels for oscillation in the direction of motion of the vehicle, each of said arms being provided with a foot, the foot extending below the plane of the wheels and being positioned relative thereto for contacting an obstacle and lifting the vehicle over the same, connecting means rigidly interconnecting the feet, and resilient means comprising a pair of resilient members interconnecting the obstacle surmounting means and the frame of the vehicle, one of the resilient members being positioned for tensioning when the feet move in a first direction, and the other being positioned for tensioning when the feet move in the opposite direction.

2. The wheeled vehicle of claim 1 wherein the resilient means comprises a cylinder, a piston slidably mounted in the cylinder, a piston rod attached to the piston and extending outwardly from the cylinder, a pair of coil springs disposed within the cylinder, one on each side of the piston and bearing on the piston from opposite directions, and means for pivotally connecting the cylinder and the piston rod one to the feet and the other to the frame of the vehicle.

REYNOLD S. VOGEL.

REFERENCES CITED

The following references are of record in the file of this patent:

UNITED STATES PATENTS

| Number | Name | Date |
|---|---|---|
| 1,301,593 | Panzner et al. | Apr. 22, 1919 |
| 1,712,485 | Tokita | May 14, 1929 |
| 2,252,771 | Katcher | Aug. 19, 1941 |